INVENTORS:
SYDNEY ARTHUR STEVENS, HARRY DUCKITT
AND RONALD CHARLES JAMES ALLEN

INVENTORS:
SYDNEY ARTHUR STEVENS, HARRY DUCKITT
AND RONALD CHARLES JAMES ALLEN

United States Patent Office 2,742,579
Patented Apr. 17, 1956

2,742,579

REGULATING APPARATUS FOR ALTERNATING ELECTRIC CURRENT SUPPLY SYSTEMS

Sydney Arthur Stevens, Harry Duckitt, and Ronald Charles James Allen, London, England, assignors to Westinghouse Brake and Signal Company Limited, London, England Application February 12, 1949, Serial No. 76,062

Claims priority, application Great Britain February 13, 1948

8 Claims. (Cl. 307—58)

This invention relates to regulating apparatus for alternating electric current supply systems of the kind in which a load circuit is supplied with current from or through two or more current sources, units or channels and has for its object to provide improved apparatus for automatically maintaining the voltage applied to the load circuit substantially constant at a predetermined value while ensuring a substantially equal or proportionately constant distribution of the load between the several sources, units or channels.

The invention is more particularly applicable to supply systems in which the load circuit is supplied with current through two or more transformer, or transformer and rectifier, units of the same or different capacity from a common supply circuit and ensures that the load shall be equally or proportionately shared between the several units while maintaining the voltage applied to the load circuit substantially constant regardless of variations in load or supply circuit voltage.

In accordance with the invention each of the sources or units is provided with a voltage regulator of the induction or other suitable type each controlled by a current balancing relay responsive to the current supplied by or through the source or unit together with a general control relay controlling the action of all the regulators collectively in response to a variation of the voltage applied to the load circuit from a predetermined value, the general control relay, when operative, superseding or controlling the balancing relays for the regulators of the individual sources or units.

The invention is particularly suitable for a system for the supply of unidirectional current to a load circuit from an alternating current supply circuit through two or more units each comprising a transformer and rectifier, each of the current balancing relays being responsive in this case to the alternating current supplied to the corresponding unit while the general control relay is responsive to the unidirectional current voltage at the load circuit terminals.

Figure 1:
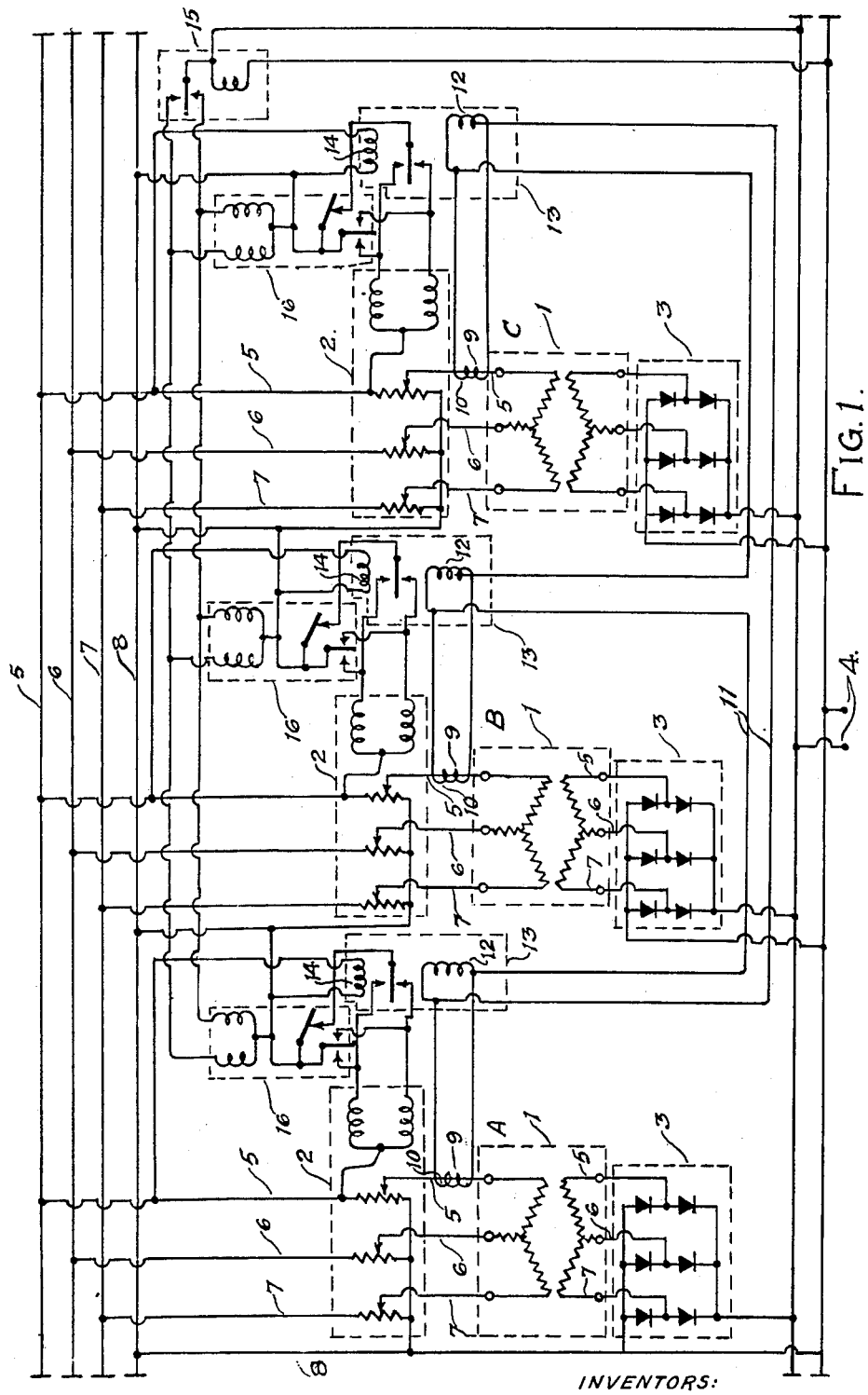
Figure 2:
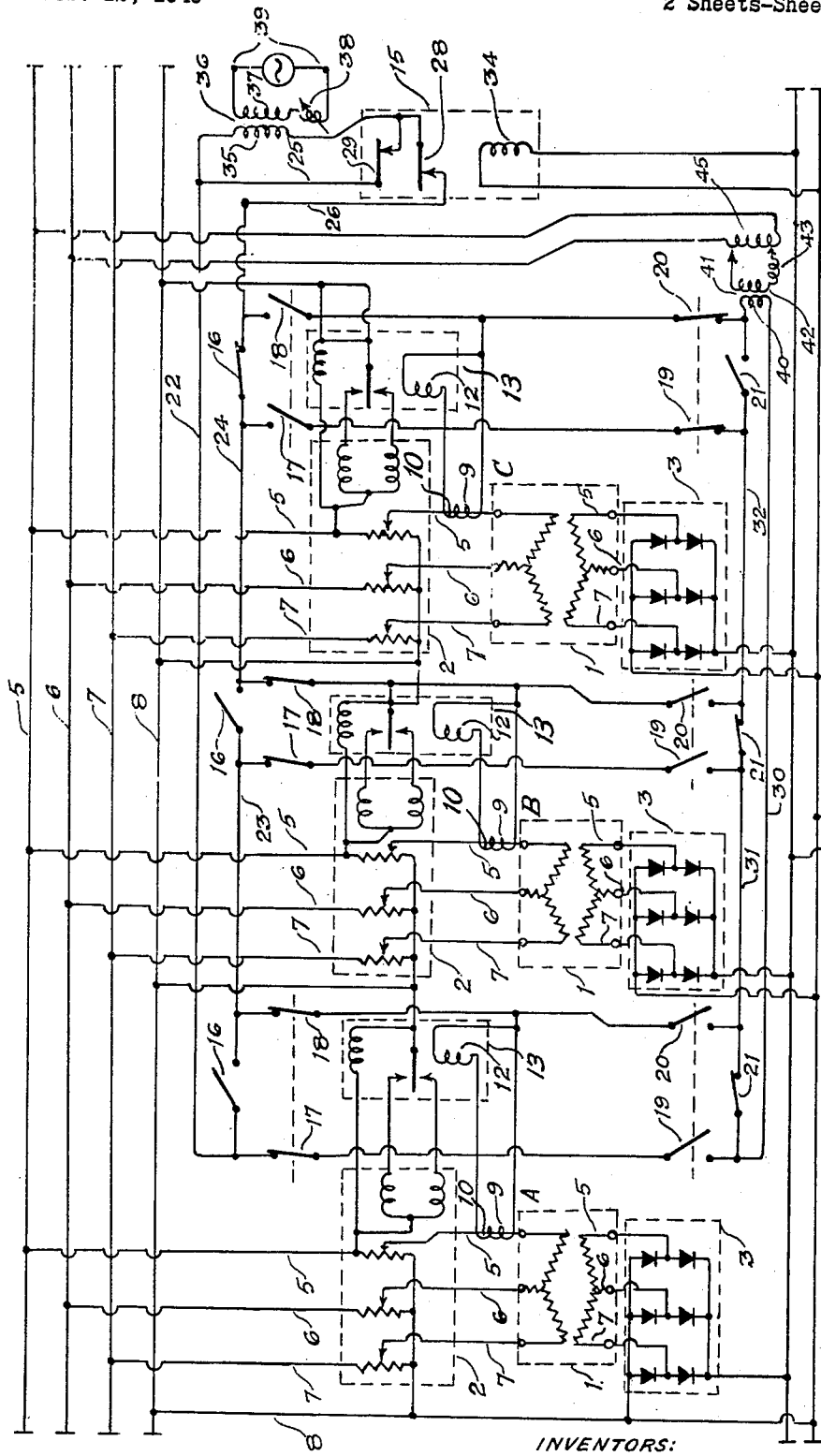

The invention is illustrated by way of example in the accompanying drawings Figure 1 of which illustrates in diagrammatic form the type of system to which the invention may be applied, while Figure 2 shows, also diagrammatically, the invention as applied to such a system.

Referring to the drawings the supply system shown in each figure comprises three supply sets or units A, B, C each consisting of a three-phase main transformer 1, the primary windings of which are connected through an induction regulator 2 to a common three phase alternating current supply circuit. The secondary windings of each transformer 1 are connected to the input terminals of a rectifier system 3, the out-put terminals 4 of which are connected to a direct current load circuit.

The three phase conductors of the alternating current supply circuit and the corresponding conductors connecting the main transformers 1 to the regulators 2 and to the rectifier systems 3 are designated by the reference numerals 5, 6, 7 and the corresponding neutral conductors by the reference numeral 8.

The same phase conductor 5 between each transformer 1 and the corresponding regulator 2 is provided with a current transformer 9 the primary winding of which is constituted by the phase conductor 5, the secondary windings 10 of the three current transformers 9 being connected in series with one another in a closed circuit 11. Connected across the secondary winding 10 of each current transformer 9 is one energising winding 12 of a two-element balancing relay 13 of the induction type, the other energising winding 14 of which is connected between the phase conductor 5 and the neutral conductor 8 so as to obtain the required phase displacement of the currents in the energising windings 12, 14 of the relay 13. The movable element of the relay 13 is arranged to close contacts controlling the action of the induction regulator 2 in one direction or the other to raise or to lower the voltage of the alternating current supplied to the primary winding of the main transformer 2 according to the direction of movement of the movable element of the relay 13 when the latter is operative.

The movable element or vane of the balancing relay 13 is preferably provided with plugs or studs of magnetisable material which cooperate with fixed permanent magnets to control the action of the element or vane so as to accelerate the movement of the vane towards one or other of its extreme positions when the relay 13 is energised and to delay the movement of the vane away from these positions until the energising current has been reduced to a relatively low value.

The apparatus shown in Figure 1 of the drawings also includes a general control relay 15 of any suitable type so arranged and connected to the load circuit terminals 4 as to be responsive to a variation in the voltage at these terminals from a normal value to a predetermined extent.

In the event of an increase or decrease in the load voltage at the terminals 4 of the load circuit to this predetermined extent, the general control relay 15, through the action of devices diagrammatically indicated at 16 as controlled from the relay 15, will render the balancing relays 13 inoperative in any suitable manner. Each of the devices 16 may, for example comprise subsidiary relays which, when energised by the action of the general control relay 15, effect the disconnection of the relay contacts of the balancing relays 13 controlling the regulators 2.

In addition to rendering the balancing relays 13 inoperative the general control relay under these conditions causes all the induction regulators 2 to be operated in a corresponding direction of movement to restore the voltage at the load circuit terminals 4 to its proper value.

These two actions, viz. rendering inoperative the balancing relays 13 and effecting a general control of the regulators 2 are indicated quite diagrammatically in the drawing as effected by the devices 16 which merely represent any suitable known apparatus for this purpose.

Under the conditions above described it will be evident that the balancing relays 13 are temporarily superseded as regards the control of the induction regulators 2 while when the general control relay 15 is inoperative, the load circuit voltage being within the predetermined limits of variation permitted, the balancing relays 13 will be operative and will act to effect the desired load distribution in the following manner.

So long as each of the units or sets A, B, C is carrying an equal share of the total load the currents supplied to the closed circuit 11 from each of the secondary windings 10 of the current transformers 9 will be the same and there will therefore be no out of balance current flowing in the corresponding winding 12 of each of the balancing relays 13. These relays will therefore remain inoperative to effect any regulating operation of the induction regulators 2 controlled thereby.

If however, the load current supplied by one of the units A, B or C is greater or less than the mean value of the load currents supplied by the other units the current supplied by the corresponding current transformer 9 to the closed circuit 11 including the secondary windings 12 of all the current transformers will be different from that supplied by the other current transformers and an out of balance current will flow through the control winding 12 of the relay 13 of the unit supplying the greater or less load than the other units. This balancing relay 13 will thus be energised to effect movement of the relay vane in one direction or the other so as to close its corresponding contacts, thereby causing the induction regulator 2 associated with the unit to operate to vary the load on the unit.

It will be understood that in cases in which the several units are of different current capacities, the regulating apparatus may be arranged to effect a proportional distribution of the total load between the several units by correspondingly determining the transformation ratios of the current transformers 9.

Referring now to Figure 2 it will be seen that in this form of the invention, the general control relay 15 instead of superseding the current balancing relays 13 as regards the control of the regulators for the individual source of units, is arranged to exercise a control of the current traversing the closed circuit in which the several current transformer secondary windings are connected.

In the apparatus shown in Figure 2 two separate closed circuits are provided each including the parallel connected current transformer windings 10 of the current transformers 9 and the windings 12 of the balancing relays 13, these circuits being alternatively effective according to whether the general control of the regulators 2 is to be effected automatically in accordance with the voltage at the load circuit terminals 4 by the action of the general control relay 15 or manually.

The two closed circuits are alternatively rendered effective by the setting of circuit switches 16, 17, 18 and 19, 20, 21 for each of the units A, B and C.

In the case of units A and B, the circuit switches are shown as set for automatic control, the switches 17, 18 and 21 being closed and the switches 16, 19 and 20 being open. The effective closed circuit for these units thus includes the relay winding 12 in parallel with the current transformer winding 10 of the sets A and B, closed switches 17, 18, conductors 22, 23 and 24, closed switch 16 of unit C, conductors 25, 26 and 27 and the closed contactor 28 or 29 or both contactors of the general control relay 15.

In the case of unit C, the circuit switches are shown as set for manual control, the switches 16, 19, 20 being closed and the switches 17, 18 and 21 being open. The closed circuit for the relay winding 12 and the current transformer winding 10 for the unit C thus includes the closed circuit switches 21 of units A and B, the closed switches 19, 20 of unit C and the conductors 30, 31, 32.

The general control relay 15 is provided with an operating winding 34 connected to the load circuit terminals 4 and arranged to effect the opening of one or other of the contacts 28, 29, in the event of the load circuit voltages at the terminals 4 being above or below a normal value to a predetermined extent. The contactor 28 thus opened when the load circuit voltage exceeds the normal value opens the normally closed circuit above referred to including the current transformer winding 10 and the balancing relay winding 12 of units A and B and as a result these relay windings will each be traversed by current causing the relays 13 of units A and B to effect a corresponding operation of the induction regulators 2 to reduce the voltage applied to the main transformers 1 of these units. Connected across the other contactor 29 is the secondary winding 35 of a current transformer 36 the primary winding 37 of which is supplied with alternating current through an adjustable reactance 38 from any suitable source, the terminals of which are indicated at 39. This source is preferably chosen such that the current supplied by the current transformer 36 is in phase with the current supplied by the current transformers 9. In the example illustrated, for example, the feed to transformer 36 being through a reactance 38, the terminals 39 would suitably be connected across phase conductors 6 and 7. As a result when the contactor 29 is opened due to the load circuit voltage at the terminals 4 being below the normal value to the predetermined extent, a current is caused to traverse the closed circuit from the transformer winding 35 in a direction to operate the balancing relays 13 of units A and B to cause the induction regulators 2 of these units to increase the voltage applied to the main transformers 1. This action will evidently continue until the secondary current of each current transformer 9 associated of units A and B has increased to substantially the same value as a current injected into the closed circuit from the transformer winding 35 as a result of the opening of the contactor 29 whereupon the current in each of the balancing relay control windings 12 of units A and B will fall to zero and the balancing relays 13 of these units will become deenergised. The current injected into the closed circuit by the opening of the contactor 29 of the general control relay 15 is arranged to correspond to the maximum load which it is desired shall be carried by the rectifiers 3 of units A and B the injected current corresponding to this load being adjusted by means of the reactance 38.

Accordingly when this maximum load is attained the deenergisation of the balancing relays 13 of units A and B will prevent any further operation of the induction regulators 2 of these units to increase the voltage applied to the main transformers 1.

As in the first form of apparatus above described a proportional distribution of the total load between several units of different capacities can be effected by suitable determination of the transformation ratio of the individual current transformers 9.

As regards unit C the circuit switches of which as above explained are set for manual control, the current flowing in the closed circuit 30, 31, 32, 33 including the current transformer winding 10 and the relay winding 12 of unit C is dependent not only upon the current in the phase conductor 5 of this unit but also upon a current injected into the closed circuit from the secondary winding 40 of a transformer 41. The primary winding 42 of the transformer 41 is connected in series with a reactance 43 to the contacts 44 of a variable ratio auto-transformer 45, the terminals of which are connected to a suitable source of alternating current for example the phase conductors 6, 7. It will be seen that the control device 45 enables an alternating current of predetermined adjustable value to be injected into the closed circuit of the relay winding 12 of the unit C so that the balancing relay 13 of this unit will cause the regulator 2 of the unit to be controlled to maintain the load current at a value determined by the setting of the control device 45.

The pairs of circuit switches 17, 18 and 19, 20 for each unit are so interlocked that only one pair of switches, viz. 17, 18 or 19, 20 can be closed at a time while switch 16 must be closed before switches 17, 18 can be opened and switch 21 must be closed before switches 19, 20 can be opened. It will be understood that by suitable setting of the circuit switches any one or more units can be adjusted for automatic or manual control as desired.

The apparatus shown in Figure 2 is particularly suitable in cases in which a floating battery is connected across the load terminals 4 and under these conditions those units (A and B for example) the circuit switches of which are set for automatic control will be automatically regulated by the operation of the general control relay 15 to vary the voltage applied to the load circuit and battery terminals 4 in accordance with the battery voltage at the terminals 4 of the relay 15. The units under automatic control will thus be regulated automatically so as to ensure even distribution of the total load between the several units while in the event of a variation of the battery voltage from the predetermined value the general control relay will operate to cause the necessary regulation of all the units under automatic control.

As regards the units under manual control (unit C for example) which are supplying charging current to another battery, the load distribution will be automatically effected by the action of the balancing relays 13 of these units while the battery is charged from the units at a rate which is pre-set by adjustment of the manual control device 41, 44.

The invention is evidently not limited to the particular forms of regulating apparatus above described and illustrated by way of example.

Having thus described our invention, what we claim is:

1. In an alternating current supply system having a plurality of parallel connected units, each supplying current to a common load circuit, in combination: a plurality of regulators each being associated with one of the units for adjusting the output voltage thereof; a plurality of current transformers each connected in the same phase conductor at each unit; a plurality of relays for the control of said regulators, respectively, each relay having an operating winding connected across the secondary winding of said current transformer associated therewith; a general control relay responsive to the voltage across the load circuit; a first normally closed contact opened by said general control relay in response to a rise in voltage across said load circuit; a second normally closed contact opened by said general control relay in response to a fall in voltage across said load circuit; a closed circuit including in series the secondary windings of all said current transformers and said contacts; and a source of alternating current connected across said second normally closed contact.

2. In an alternating current supply system having a plurality of parallel connected units, each supplying current to a common load circuit, in combination: a plurality of regulators each being associated with one of the units for adjusting the output voltage thereof; a plurality of current transformers each connected in the same phase conductor at each unit; a plurality of relays for the control of said regulators, respectively, each relay having an operating winding connected across the secondary winding of said current transformer associated therewith; a general control relay responsive to the voltage across the load circuit; a first normally closed contact opened by said general control relay in response to a rise in voltage across said load circuit; a second normally closed contact opened by said general control relay in response to a fall in voltage across said load circuit; a closed circuit including in series the secondary windings of all said current transformers and said contacts; and a source of alternating current being in phase with the current supplied by said current transformers and connected across said second normally closed contact.

3. In an alternating current supply system having a plurality of parallel connected units, each supplying current to a common load circuit, in combination: a plurality of regulators each being associated with one of the units for adjusting the output voltage thereof; a plurality of current transformers each connected in the same phase conductor at each unit; a plurality of relays for the control of said regulators, respectively, each relay having an operating winding connected across the secondary winding of said current transformer associated therewith; a general control relay responsive to the voltage across the load circuit; a first normally closed contact opened by said general control relay in response to a rise in voltage across said load circuit; a second normally closed contact opened by said general control relay in response to a fall in voltage across said load circuit; a first source of alternating current connected across said second normally closed contact; a second adjustable source of alternating current; a first closed series circuit including said normally closed contacts; a second closed series circuit including said second source; and means for selectively connecting the secondary windings of each of said current transformers in said first closed series and in said second closed series circuit.

4. In an alternating current supply system having a plurality of parallel connected units, each supplying current to a common load circuit, in combination: a plurality of regulators each being associated with one of the units for adjusting the output voltage thereof; a plurality of current transformers each connected in the same phase conductor at each unit; a plurality of relays for the control of said regulators, respectively, each relay having an operating winding connected across the secondary winding of said current transformer associated therewith; a general control relay responsive to the voltage across the load circuit; a first normally closed contact opened by said general control relay in response to a rise in voltage across said load circuit; a second normally closed contact opened by said general control relay in response to a fall in voltage across said load circuit; a first source of alternating current connected across said second normally closed contact in phase with the current supplied by said current transformers; a second adjustable source of alternating current in phase with the current supplied by said current transformers; a first closed series circuit including said normally closed contacts; a second closed series circuit including said second source; and means for selectively connecting the secondary windings of each of said current transformers in said first closed series circuit and in said second closed series circuit.

5. In apparatus for controlling the supply of direct current to a load circuit from an alternating current supply through a plurality of parallel connected transformer and rectifier units, each unit including regulating means for regulating the output of the unit, in combination, a plurality of load balancing relays controlling the regulating means, respectively; a plurality of current transformers connected in the same phase conductor at each unit; operating windings forming part of said balancing relays, respectively, and connected across the secondary winding of said current transformers, respectively; a closed series circuit including the secondary windings of said current transformers and a first and a second normally closed contact; a source of alternating current connected across said second normally closed contact; and a general control relay responsive to the voltage across the load circuit for opening said first contact when the voltage across the load circuit rises above a first predetermined value, and for opening said second contact when the voltage across the load circuit falls below a second predetermined value.

6. In apparatus for controlling the supply of direct current to a load circuit from an alternating current supply through a plurality of parallel connected transformer and rectifier units, each unit including regulating means for regulating the output of the unit, in combination, a plurality of load balancing relays controlling the regulating means, respectively; a plurality of current transformers connected in the same phase conductor at each unit; operating windings forming part of said balancing relays, respectively, and connected across the secondary winding of said current transformers, respectively; a first auxiliary source of alternating current; a second adjustable auxiliary source of alternating current; a first closed series circuit including means for opening said first circuit when the voltage across the load circuit rises above a first predetermined value and means for including said first auxiliary source in said first closed circuit when said voltage falls below a second predetermined value;

a second closed series circuit including said second adjustable auxiliary source; and means for connecting each secondary winding of said current transformers alternatively in said first closed series circuit and said second closed series circuit.

7. In combination, a plurality of alternating current generators supplying a common bus-bar system; output regulating means for each of said generators; load balancing relays for controlling, respectively, said regulating means in accordance with the load supplied by said generator associated therewith; a plurality of current transformers, each connected in the same phase conductor between said generators and the bus-bars, respectively; an operating winding in each of said balancing relays connected across the secondary winding of said current transformer associated therewith; a closed series circuit including the secondary windings of all said current transformers; an auxiliary source of alternating current derived from the bus-bar system; means for automatically opening said closed circuit when the bus-bar voltage rises above a first predetermined value; and means for automatically including said auxiliary source in said closed circuit when the bus-bar voltage falls below a second predetermined value.

8. In combination, a first load circuit; a second load circuit; a plurality of alternating current generators for supplying alternating current to said load circuits; output regulating means for each generator; load balancing relays for controlling, respectively, said regulating means in accordance with the load supplied by said generator associated therewith; a plurality of current transformers, each connected in the same phase conductor of each generator output; an operating winding in each of said balancing relays connected across the secondary winding of said current transformer associated therewith; a first auxiliary source of alternating current derived from said first load circuit; a second auxiliary source of alternating current derived from said second load circuit; means for adjusting the value of the current delivered by said second auxiliary source; a first closed series circuit including means for opening said first series circuit when the voltage across said first load circuit rises above a first predetermined value; means for including said first auxiliary source in said first closed series circuit when the voltage across said first load circuit falls below a second predetermined value; second closed series circuit including said secondary auxiliary source; and means for connecting each secondary winding of said current transformers, alternatively in said first closed series circuit and in said second closed series circuit.

References Cited in the file of this patent
UNITED STATES PATENTS

| | | |
|---|---|---|
| 1,667,752 | Thomas | May 1, 1928 |
| 2,079,488 | Champlin | May 4, 1937 |
| 2,103,818 | Kucera | Dec. 28, 1937 |
| 2,322,249 | Minneci | June 22, 1943 |
| 2,360,102 | Bowman | Oct. 10, 1944 |
| 2,420,922 | Walley | May 20, 1947 |